United States Patent
Hellring et al.

(10) Patent No.: US 11,355,741 B2
(45) Date of Patent: Jun. 7, 2022

(54) BATTERY ELECTRODE COATINGS APPLIED BY WATERBORNE ELECTRODEPOSITION

(71) Applicant: PPG Industries Ohio, Inc., Cleveland, OH (US)

(72) Inventors: Stuart D. Hellring, Pittsburgh, PA (US); Landon J. Oakes, Allison Park, PA (US); Kurt G. Olson, Gibsonia, PA (US); Chad A. Landis, Oakmont, PA (US); Jacob W. Mohin, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 347 days.

(21) Appl. No.: 16/227,320

(22) Filed: Dec. 20, 2018

(65) Prior Publication Data
US 2020/0203707 A1    Jun. 25, 2020

(51) Int. Cl.
*H01M 4/131* (2010.01)
*H01M 4/04* (2006.01)
*H01M 4/1391* (2010.01)
*H01M 4/62* (2006.01)
*H01M 4/02* (2006.01)

(52) U.S. Cl.
CPC ......... *H01M 4/131* (2013.01); *H01M 4/0452* (2013.01); *H01M 4/1391* (2013.01); *H01M 4/621* (2013.01); *H01M 2004/028* (2013.01)

(58) Field of Classification Search
CPC .... H01M 4/131; H01M 4/1391; H01M 4/621; H01M 4/0452; H01M 4/13; H01M 4/139; H01M 10/0525; H01M 2004/028
See application file for complete search history.

(56) References Cited

U.S. PATENT DOCUMENTS

| | | |
|---|---|---|
| 4,514,552 A | 4/1985 | Shay et al. |
| 4,786,565 A | 11/1988 | Shirai |
| 5,192,592 A | 3/1993 | Shay |
| 7,217,443 B2 | 5/2007 | Bobsein et al. |
| 9,085,713 B2 | 7/2015 | Sedillo |
| 9,090,727 B2 | 7/2015 | Hough et al. |
| 9,150,736 B2 | 10/2015 | Daughenbaugh et al. |
| 9,202,638 B2 | 12/2015 | Amin-Sanayei et al. |
| 9,228,041 B2 | 1/2016 | Martinez-Castro et al. |
| 9,239,051 B1 | 1/2016 | Amin-Sanayei et al. |
| 9,520,591 B2 | 12/2016 | Daughenbaugh et al. |
| 9,882,216 B2 | 1/2018 | Sasaki |
| 9,923,189 B2 | 3/2018 | Xiao |
| 10,090,527 B2 | 10/2018 | Sonobe |
| 2002/0168569 A1 | 11/2002 | Barriere et al. |
| 2013/0341194 A1 | 12/2013 | Fuchsbichler et al. |
| 2015/0280239 A1 | 10/2015 | Hellring et al. |
| 2015/0357079 A1* | 12/2015 | Daughenbaugh ........ C09D 7/61 205/122 |
| 2016/0118664 A1 | 4/2016 | Sonobe |
| 2016/0204439 A1 | 7/2016 | Sonobe |
| 2016/0380255 A1 | 12/2016 | Daughenbaugh et al. |
| 2017/0125815 A1* | 5/2017 | Amin-Sanayei .... H01M 4/0404 |
| 2017/0352886 A1 | 12/2017 | Matsuzaki et al. |
| 2018/0137949 A1 | 5/2018 | Daughenbaugh et al. |

FOREIGN PATENT DOCUMENTS

| | | |
|---|---|---|
| EP | 0226097 | 5/1990 |
| EP | 1384771 | 1/2004 |
| EP | 2621005 | 7/2013 |
| JP | 2011134618 | 7/2011 |
| KR | 20130084539 | 7/2013 |
| WO | 2015153558 A1 | 10/2015 |
| WO | 2014065407 | 9/2016 |
| WO | 2018160799 A1 | 9/2018 |

OTHER PUBLICATIONS

Dow Construction Chemicals ("Acrysol ASE-60 ER ASE Rheology Modifier". Review date Jul. 2012).*
Han et al. (Cross-linked Poly(acrylic acid) with Polycarbodiimide as Advanced binder for Si/Graphite Composition Negative Electrodes in Li-Ion Batteries).*

* cited by examiner

*Primary Examiner* — Stephen J Yanchuk
(74) *Attorney, Agent, or Firm* — Charles M. Yeomans

(57) ABSTRACT

The present invention is directed towards a method of coating a substrate comprising electrocoating an electrodepositable coating composition onto the substrate, the electrodepositable coating composition comprising a binder comprising a pH-dependent rheology modifier; an electrochemically active material and/or an electrically conductive agent; and an aqueous medium. Also disclosed are electrodepositable coating compositions, coated substrates and electrical storage devices.

18 Claims, No Drawings

BATTERY ELECTRODE COATINGS APPLIED BY WATERBORNE ELECTRODEPOSITION

FIELD OF THE INVENTION

The present invention is directed towards electrodepositable coating compositions and battery electrode coatings applied by waterborne electrodeposition.

BACKGROUND INFORMATION

There is a trend in the electronics industry to produce smaller devices, powered by smaller and lighter batteries. Batteries with a negative electrode—such as a carbonaceous material, and a positive electrode—such as lithium metal oxides can provide relatively high power and low weight. Binders for producing such electrodes are usually combined with the negative electrode or positive electrode in the form of a solventborne or waterborne slurry. The solventborne slurries present safety, health and environmental dangers. Many organic solvents are toxic and flammable, volatile in nature, carcinogenic and involve special manufacturing controls to mitigate risk and reduce environmental pollution, and the waterborne slurries have oftentimes produced unsatisfactory electrodes having poor adhesion and/or poor battery performance. Once applied, the bound ingredients are able to tolerate large volume expansion and contraction during charge and discharge cycles without losing interconnectivity within the electrodes. Interconnectivity of the active ingredients in an electrode is extremely important in battery performance, especially during charging and discharging cycles, as electrons must move through the electrode, and lithium ion mobility requires interconnectivity within the electrode between particles. Improved battery performance and adhesion of the coating to the electrical current collector are desired, particularly without the use of carcinogenic materials and environmental pollution.

SUMMARY OF THE INVENTION

Disclosed herein is an electrodepositable coating composition comprising a binder comprising a pH-dependent rheology modifier comprising the residue of a crosslinking monomer and/or a monoethylenically unsaturated alkylated alkoxylate monomer; an electrochemically active material and/or an electrically conductive agent; and an aqueous medium.

Also disclosed herein is a method of coating a substrate comprising electrocoating an electrodepositable coating composition onto the substrate, the electrodepositable coating composition comprising a binder comprising a pH-dependent rheology modifier; an electrochemically active material and/or an electrically conductive agent; and an aqueous medium.

Further disclosed herein are coated substrates and electrical storage devices.

DETAILED DESCRIPTION OF THE INVENTION

As stated above, the present invention is directed to an electrodepositable coating composition comprising a binder comprising a pH-dependent rheology modifier comprising the residue of a crosslinking monomer and/or a monoethylenically unsaturated alkylated ethoxylate monomer; an electrochemically active material and/or an electrically conductive agent; and an aqueous medium.

According to the present invention, the term "electrodepositable coating composition" refers to a composition that is capable of being deposited onto an electrically conductive substrate under the influence of an applied electrical potential.

According to the present invention, the electrodepositable coating composition comprises a binder. The binder serves to bind together particles of the electrodepositable coating composition, such as the electrochemically active material, the electrically conductive agent or both, upon electrodeposition of the coating composition onto a substrate. The binder comprises a film-forming polymer and optionally may further comprise a crosslinking agent that comprises functional groups reactive with functional groups present on the film-forming polymer. The film-forming polymer and crosslinking agent may comprise organic compounds.

According to the present invention, the film-forming polymer of the binder comprises a pH-dependent rheology modifier. The pH-dependent rheology modifier may comprise a portion of or all of the film-forming polymer and/or binder. As used herein, the term "pH-dependent rheology modifier" refers to an organic compound, such as a polymer, that has a variable rheological effect based upon the pH of the composition. The pH-dependent rheology modifier may affect the viscosity of the composition on the principle of significant volume changes of the pH-dependent rheology modifier induced by changes in the pH of the composition. For example, the pH-dependent rheology modifier may be soluble at a pH range and provide certain rheological properties and may be insoluble and coalesce at a critical pH value (and above or below based upon the type of pH-dependent rheology modifier) which causes a reduction in the viscosity of the composition due to a reduction in the volume of the rheology modifier. The relationship between the pH of the composition and viscosity due to the presence of the pH-dependent rheology modifier may be non-linear. The pH-dependent rheology modifier may comprise an alkali-swellable rheology modifier or an acid swellable rheology modifier, depending upon the type of electrodeposition that the electrodepositable coating composition is to be employed. For example, alkali-swellable rheology modifiers may be used for anionic electrodeposition, whereas acid swellable rheology modifiers may be used for cathodic electrodeposition.

As used herein, the term "alkali-swellable rheology modifier" refers to a rheology modifier that increases the viscosity of a composition (i.e., thickens the composition) as the pH of the composition increases. The alkali-swellable rheology modifier may increase viscosity at a pH of about 2.5 or greater, such as about 3 or greater, such as about 3.5 or greater, such as about 4 or greater, such as about 4.5 or greater, such as about 5 or greater.

Non-limiting examples of alkali-swellable rheology modifiers include alkali-swellable emulsions (ASE), hydrophobically modified alkali-swellable emulsions (HASE), star polymers, and other materials that provide pH-triggered rheological changes at low pH, such as the pH values described herein. The alkali-swellable rheology modifiers may comprise addition polymers having constitutional units comprising the residue of ethylenically unsaturated monomers. For example, the alkali-swellable rheology modifiers may comprise addition polymers having constitutional units comprising, consisting essentially of, or consisting of the residue of: (a) 2 to 70% by weight of a monoethylenically unsaturated carboxylic acid, such as 20 to 70% by weight, such as 25 to 55% by weight, such as 35 to 55% by weight, such as 40 to 50% by weight, such as 45 to 50% by weight; (b) 20 to 80% by weight of a $C_1$ to $C_6$ alkyl (meth)acrylate, such as 35 to 65% by weight, such as 40 to 60% by weight, such as 40 to 50% by weight, such as 45 to 50% by weight; and at least one of (c) 0 to 3% by weight of a crosslinking monomer, such as 0.1 to 3% by weight, such as 0.1 to 2% by weight; and/or (d) 0 to 60% by weight of a monoethylenically unsaturated alkyl alkoxylate monomer, such as 0.5 to 60% by weight, such as 10 to 50% by weight, the % by weight being based on the total weight of the addition polymer. The ASE rheology modifiers may comprise (a) and (b) and may optionally further comprise (c), and the HASE rheology modifiers may comprise (a), (b) and (d), and may optionally further comprise (c). When (c) is present, the pH-dependent rheology modifier may be referred to as a crosslinked pH-dependent rheology modifier. When the acid groups have a high degree of protonation (i.e., are un-neutralized) at low pH, the rheology modifier is insoluble in water and does not thicken the composition, whereas when the acid is substantially deprotonated (i.e., substantially neutralized) at higher pH values, the rheology modifier becomes soluble or dispersible (such as micelles or microgels) and thickens the composition.

The (a) monoethylenically unsaturated carboxylic acid may comprise a $C_3$ to $C_8$ monoethylenically unsaturated carboxylic acid such as acrylic acid, methacrylic acid, and the like, as well as combinations thereof.

The (b) $C_1$ to $C_8$ alkyl (meth)acrylate may comprise a $C_1$ to $C_6$ alkyl (meth)acrylate, such as a $C_1$ to $C_4$ alkyl (meth)acrylate. The $C_1$ to $C_8$ alkyl (meth)acrylate may comprise a non-substituted $C_1$ to $C_8$ alkyl (meth)acrylate such as, for example, methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, isopentyl (meth)acrylate, hexyl (meth)acrylate, heptyl (meth)acrylate, isoheptyl (meth)acrylate, 2-ethylhexyl (meth)acrylate, or combinations thereof.

The (c) crosslinking monomer may comprise a polyethylenically unsaturated monomer such as ethylene glycol di(meth)acrylate, 1,6-hexanediol di(meth)acrylate, divinylbenzene, trimethylolpropane diallyl ether, tetraallyl pentaerythritol, triallyl pentaerythritol, diallyl pentaerythritol, diallyl phthalate, triallyl cyanurate, bisphenol A diallyl ether, methylene bisacrylamide, allyl sucroses, and the like, as well as combinations thereof.

The (d) monoethylenically unsaturated alkylated ethoxylate monomer may comprise a monomer having a polymerizable group, a hydrophobic group and a bivalent polyether group of a poly(alkylene oxide) chain, such as a poly(ethylene oxide) chain having about 5-150 ethylene oxide units, such as 6-10 ethylene oxide units, and optionally 0-5 propylene oxide units. The hydrophobic group is typically an alkyl group having 6-22 carbon atoms (such as a dodecyl group) or an alkaryl group having 8-22 carbon atoms (such as octyl phenol). The bivalent polyether group typically links the hydrophobic group to the polymerizable group. Examples of the bivalent polyether group linking group and hydrophobic group are a bicycloheptyl-polyether group, a bicycloheptenyl-polyether group or a branched $C_5$-$C_{50}$ alkyl-polyether group, wherein the bicycloheptyl-polyether or bicycloheptenyl-polyether group may optionally be substituted on one or more ring carbon atoms by one or two $C_1$-$C_6$ alkyl groups per carbon atom.

In addition to the monomers described above, the pH-dependent rheology modifier may comprise other ethylenically unsaturated monomers. Examples thereof include substituted alkyl (meth)acrylate monomers substituted with functional groups such as hydroxyl, amino, amide, glycidyl, thiol, and other functional groups; alkyl (meth)acrylate monomers containing fluorine; aromatic vinyl monomers; and the like. Alternatively, the pH-dependent rheology modifier may be substantially free, essentially free, or completely free of such monomers. As used herein, a pH-dependent rheology modifier is substantially free or essentially free of a monomer when constitutional units of that monomer are present, if at all, in an amount of less than 0.1% by weight or less than 0.01% by weight, respectively, based on the total weight of the pH-dependent rheology modifier.

The pH-dependent rheology modifier may be substantially free, essentially free, or completely free of amide, glycidyl or hydroxyl functional groups. As used herein, a pH-dependent rheology modifier is substantially free or essentially free of amide, glycidyl or hydroxyl functional groups if such groups are present, if at all, in an amount of less than 1% or less than 0.1% based on the total number of functional groups present in the pH-dependent rheology modifier.

The pH-dependent rheology modifier may comprise, consist essentially of, or consist of constitutional units of the residue of methacrylic acid, ethyl acrylate and a crosslinking monomer, present in the amounts described above.

The pH-dependent rheology modifier may comprise, consist essentially of, or consist of constitutional units of the residue of methacrylic acid, ethyl acrylate and a monoethylenically unsaturated alkyl alkoxylate monomer, present in the amounts described above.

The pH-dependent rheology modifier may comprise, consist essentially of, or consist of methacrylic acid, ethyl acrylate, a crosslinking monomer and a monoethylenically unsaturated alkyl alkoxylate monomer, present in the amounts described above.

Commercially available pH-dependent rheology modifiers include alkali-swellable emulsions such as ACRYSOL ASE-60, hydrophobically modified alkali-swellable emulsions such as ACRYSOL HASE TT-615, and ACRYSOL DR-180 HASE, each of which is available from the Dow Chemical Company, and star polymers, including those produced by atom transfer radical polymerization, such as fracASSIST® prototype 2 from ATRP Solutions.

Exemplary viscosity data showing the impact of the alkali-swellable rheology modifier across a range of pH values of a composition was obtained for some non-limiting examples of alkali-swellable rheology modifiers using a Brookfield viscometer operated at 20 RPMs and using a #4 spindle. The alkali-swellable rheology modifiers ACRYSOL ASE-60, ACRYSOL HASE TT-615, and ACRYSOL DR-180 HASE were characterized at 4.25% solids in a solution of deionized water. A star polymer (fracASSIST® prototype 2) was investigated at 0.81% solids due to the limited solubility of the polymer at low pH. The pH was adjusted through the addition of dimethyl ethanolamine ("DMEA"). The viscosity measurements in centipoise (cps) across the range of pH values is provided below in Table 1.

TABLE 1

| | Rheology Modifier | | | | | | | |
|---|---|---|---|---|---|---|---|---|
| | ACRYSOL ASE-60 | | ACRYSOL HASE-TT-615 | | fracASSIST ® prototype 2 | | ACRYSOL DR-180HASE | |
| | pH | Viscosity | pH | Viscosity | pH | Viscosity | pH | Viscosity |
| Property | 3.53 | 0 | 4.24 | 0 | 4.04 | 0 | 4.30 | 0 |
| | 6.31 | 2,010 | 5.90 | 454 | 6.09 | 2,274 | 6.10 | 90 |
| | 6.43 | 19,280 | 6.40 | 15,600 | 7.23 | 2,352 | 6.20 | 11,160 |
| | 6.77 | 19,130 | 7.04 | Off-scale | 7.68 | 1,914 | 7.13 | Off-scale |
| | 7.42 | 17,760 | — | — | 8.72 | 1,590 | — | — |

As shown in Table 1, a composition of water and an alkali-swellable rheology modifier at 4.25% by weight of the total composition may have an increase in viscosity of at least 500 cps over an increase in pH value of 3 pH units within the pH range of 3 to 12, such as an increase of at least 1,000 cps, such as an increase of at least 2,000 cps, such as an increase of at least 3,000 cps, such as an increase of at least 5,000 cps, such as an increase of at least 7,000 cps, such as an increase of at least 8,000 cps, such as an increase of at least 9,000 cps, such as an increase of at least 10,000 cps, such as an increase of at least 12,000 cps, such as an increase of at least 14,000 cps, or more. For example, as shown for the ACRYSOL ASE-60 alkali-swellable rheology modifier in Table 1, an increase in pH from about 3.5 to about 6.5 results in an increase in the viscosity of the composition of about 19,000 cps. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 7, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a 4.25% by weight solution of the alkali-swellable rheology modifier, the % by weight based on the total weight of the solution, may have a viscosity increase of at least 1,000 cps when measured from about pH 4 to about pH 6.5, such as at least 1,500 cps, such as at least 1,900 cps, such as at least 5,000 cps, such as at least 10,000 cps, such as at least 15,000 cps, such as at least 17,000 cps, as measured using a Brookfield viscometer using a #4 spindle and operated at 20 RPMs. A composition of water and an alkali-swellable rheology modifier at 4.25% by weight of the total composition may result in a corresponding decrease in the viscosity of the composition over a corresponding decrease in pH value.

As shown in Table 1, a composition of water and an alkali-swellable rheology modifier of a star polymer at 0.81% by weight of the total composition may have a viscosity increase of at least 400 cps when measured from about pH 4 to about pH 6.5, such as at least 600 cps, such as at least 800 cps, such as at least 1,000 cps, such as at least 1,200 cps, such as at least 1,400 cps, such as at least 2,000 cps, such as at least 2,200 cps, as measured using a Brookfield viscometer using a #4 spindle and operated at 20 RPMs.

As used herein, the term "star polymer" refers to branched polymers with a general structure consisting of several (three or more) linear chains connected to a central core. The core of the polymer can be an atom, molecule, or macromolecule; the chains, or "arms", may include variable-length organic chains. Star-shaped polymers in which the arms are all equivalent in length and structure are considered homogeneous, and ones with variable lengths and structures are considered heterogeneous.

As used herein, the term "acid-swellable rheology modifier" refers to a rheology modifier that is insoluble at high pH and does not thicken the composition and is soluble at lower pH and thickens the composition. The acid-swellable rheology modifier may increase viscosity at a pH of about 4 or less, such as about 4.5 or less, such as about 5 or less, such as about 6 or less.

The pH-dependent rheology modifier may be present in the electrodepositable coating composition in an amount of at least 10% by weight, such as at least 20% by weight, such as at least 30% by weight, such as at least 40%, such as at least 50% by weight, such as at least 60% by weight, such as at least 70% by weight, such as at least 75% by weight, such as at least 80% by weight, such as at least 85% by weight, such as at least 90% by weight, such as at least 93% by weight, such as at least 95% by weight, such as 100% by weight, and may be present in an amount of no more than 100% by weight, such as no more than 99% by weight, such as no more than 95% by weight, such as no more than 93% by weight, based on the total solids weight of the binder solids. The pH-dependent rheology modifier may be present in the electrodepositable coating composition in an amount of 10% to 100% by weight, such as 20% to 100% by weight, such as 30% to 100% by weight, 40% to 100% by weight, 50% to 100% by weight, 60% to 100% by weight, 70% to 100% by weight, 75% to 100% by weight, 80% to 100% by weight, 85% to 100% by weight, 90% to 100% by weight, 93% to 100% by weight, 95% to 100% by weight, such as 50% to 99% by weight, such as 75% to 95% by weight, such as 87% to 93% by weight, based on the total solids weight of the binder solids.

The pH-dependent rheology modifier may be present in the electrodepositable coating composition in an amount of at least 0.1% by weight, such as at least 0.2% by weight, such as at least 0.3% by weight, such as at least 1% by weight, such as at least 1.5% by weight, such as at least 2% by weight, and may be present in an amount of no more than 10% by weight, such as no more than 5% by weight, such as no more than 4.5% by weight, such as no more than 4% by weight, such as no more than 3% by weight, such as no more than 2% by weight, such as no more than 1% by weight, based on the total solids weight of the electrodepositable coating composition. The pH-dependent rheology modifier may be present in the electrodepositable coating composition in an amount of 0.1% to 10% by weight, such as 0.2% to 10% by weight, such as 0.3% to 10% by weight, such as 1% to 7% by weight, such as 1.5% to 5% by weight, such as 2% to 4.5% by weight, such as 3% to 4% by weight, based on the total solids weight of the electrodepositable coating composition.

It has been surprisingly discovered that the use of the pH-dependent rheology modifier in the electrodepositable coating composition in the amounts herein allows for the production of electrodes by electrodeposition. Comparable electrodepositable coating compositions that do not include the pH-dependent rheology modifier were not able to produce electrodes by electrodeposition. Without intending to be bound by any theory, it is believed that the pH dependence of the rheology modifier assists in the electrodeposition of the electrodepositable coating composition because the significant difference in pH of the electrodeposition bath at the surface of the electrode to be coated relative to the rest of the electrodeposition bath causes the pH-dependent rheology modifier to undergo a significant reduction in volume at or in close proximity to the surface of the electrode to be coated inducing coalescence of the pH-dependent rheology modifier and other components of the electrodepositable coating composition on the surface of the electrode to be coated. For example, the pH at the surface of the anode in anodic electrodeposition is significantly reduced relative to the rest of the deposition bath. Likewise, the pH at the surface cathode in cathodic electrodeposition is significantly higher than the rest of the electrodeposition bath. The difference in pH at the surface of the electrode to be coated during electrodeposition relative to the electrodepositable bath in a static state may be at least 6 units, such as at least 7 units, such as at least 8 units.

The pH of the electrodepositable coating composition will depend upon the type of electrodeposition in which the composition is to be used, as well as additives, such as pigments, fillers, and the like, included in the electrodepositable coating composition. For example, an anionic electrodepositable coating composition may have a pH from about 6 to about 12, such as about 6.5 to about 11, such as about 7 to about 10.5. In contrast, a cationic electrodepositable coating composition may have a pH from about 4.5 to about 10, such as about 4.5 to about 5.5, such as about 8 to about 9.5.

According to the present invention, the electrodepositable coating composition further comprises an aqueous medium comprising water. As used herein, the term "aqueous medium" refers to a liquid medium comprising more than 50% by weight water, based on the total weight of the aqueous medium. Such aqueous mediums may comprise less than 50% by weight organic solvent, or less than 40% by weight organic solvent, or less than 30% by weight organic solvent, or less than 20% by weight organic solvent, or less than 10% by weight organic solvent, or less than 5% by weight organic solvent, or less than 1% by weight organic solvent, or less than 0.8% by weight organic solvent, or less than 0.1% by weight organic solvent, based on the total weight of the aqueous medium. Water comprises more than 50% by weight of the aqueous medium, such as at least 60% by weight, such as at least 70% by weight, such as at least 80% by weight, such as at least 85% by weight, such as at least 90% by weight, such as at least 95% by weight, such as at least 99% by weight, such as at least 99.9% by weight, such as 100% by weight, based on the total weight of the aqueous medium. Water may comprise 50.1% to 100% by weight, such as 70% to 100% by weight, such as 80% to 100% by weight, such as 85% to 100% by weight, such as 90% to 100% by weight, such as 95% to 100% by weight, such as 99% to 100% by weight, such as 99.9% to 100% by weight, based on the total weight of the aqueous medium. The aqueous medium may further comprise one or more organic solvent(s). Examples of suitable organic solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. The electrodepositable coating composition may in particular be provided in the form of a dispersion, such as an aqueous dispersion.

Organic solvent is oftentimes added to a waterborne formulation to modify viscosity within a desired range. The organic solvent added to the electrodepositable coating composition, or other waterborne formulation, may induce polymer swelling to achieve viscosity modification. The use of pH-dependent rheology modifiers described herein may allow for a reduction in the total amount of organic solvent required to meet desired viscosity targets to reduce the environmental impact of the compositions. Accordingly, use of the pH-dependent rheology modifier as described above in an electrodepositable coating composition may allow for production of electrodepositable coating compositions having a lower volatile organic content (VOC) than previously produced waterborne formulations. As used herein, the term "volatile organic content" or "VOC" refers to organic compounds having a boiling point of less than 250° C. As used herein, the term "boiling point" refers to the boiling point of a substance at standard atmospheric pressure of 101.325 kPa (1.01325 bar or 1 atm), also referred to as the normal boiling point. The volatile organic content includes volatile organic solvents. As used herein, the term "volatile organic solvent" refers to organic compounds having a boiling point of less than 250° C., such as less than 200° C. For example, the VOC of the electrodepositable coating composition of the present invention may be no more than 500 g/L, such as no more than 300 g/L, such as no more than 150 g/L, such as no more than 50 g/L, such as no more than 1 g/L, such as 0 g/L, and may range from 0 to 500 g/L, such as 0.1 to 300 g/L, such as 0.1 to 150 g/L, such as 0.1 to 50 g/L, such as 0.1 to 1 g/L. The VOC may be calculated according to the following formula:

$$VOC\ (g/L) = \frac{\text{total weight of } VOC\ (g)}{\text{volume of total composition (L)} - \text{volume of water (L)}}$$

The organic solvent may be present, if at all, in an amount of less than 30% by weight, such as less than 20% by weight, such as less than 10% by weight, such as less than 5% by weight, such as less than 3% by weight, such as less than 1% by weight, such as less than 0.5% by weight, such as less than 0.3% by weight, such as less than 0.1% by weight, such as 0.0% by weight, based on the total weight of the electrodepositable coating composition.

Water is present in the aqueous medium such that the total amount of water present in the electrodepositable coating composition is at least 40% by weight, such as at least 45% by weight, such as at least 50% by weight, such as at least 55% by weight, such as at least 60% by weight, such as at least 65% by weight, such as at least 70% by weight, such as at least 75% by weight, such as at least 80% by weight, such as at least 85% by weight, such as at least 90% by weight, such as at least 95% by weight, and may be present in an amount of no more than 99% by weight, such as no more than 95% by weight, such as no more than 90% by weight, such as no more than 85% by weight, such as no more than 80% by weight, such as no more than 75% by weight, based on the total weight of the electrodepositable coating composition. Water may be present in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The electrodepositable coating composition may have a solids content of no more than 60% by weight, such as no more than 55% by weight, such as no more than 50% by weight, such as no more than 45% by weight, such as no more than 40% by weight, such as no more than 35% by weight, such as no more than 30% by weight, such as no more than 25% by weight, such as no more than 20% by weight, such as no more than 15% by weight, such as no more than 10% by weight, such as no more than 5% by weight, such as no more than 1% by weight, based on the total weight of the electrodepositable coating composition. The electrodepositable coating composition may have a solids content of 0.1% to 60% by weight, such as 0.1% to 55% by weight, such as 0.1% to 50% by weight, such as 0.1% to 45% by weight, such as 0.1% to 40% by weight, such as 0.1% to 35% by weight, such as 0.1% to 30% by weight, such as 0.1% to 25% by weight, such as 0.1% to 20% by weight, such as 0.1% to 15% by weight, such as 0.1% to 10% by weight, such as 0.1% to 5% by weight, such as 0.1% to 1% by weight, based on the total weight of the electrodepositable coating composition.

The electrodepositable coating composition may be packaged in the form of a concentrate that is diluted with water and optionally organic solvent prior to use as an electrodepositable coating composition. Upon dilution, the electrodepositable coating composition should have a solids and water content as described herein.

According to the present invention, the electrodepositable coating composition may optionally further comprise an electrochemically active material. The material constituting the electrochemically active material contained in the electrodepositable coating composition is not particularly limited and a suitable material can be selected according to the type of an electrical storage device of interest.

The electrochemically active material may comprise a material for use as an active material for a positive electrode. The electrochemically active material for a positive electrode may comprise a material capable of incorporating lithium (including incorporation through lithium intercalation/deintercalation), a material capable of lithium conversion, or combinations thereof. Non-limiting examples of electrochemically active materials capable of incorporating lithium include $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, and combinations thereof. Ratios of the transition metals present in the electrochemically active materials may vary. For example, $Li(NiMnCo)O_2$ (sometimes referred to as "NMC") may have ratios of Ni:Mn:Co of 1:1:1, 5:3:2, 6:2:2, and 8:1:1. Non-limiting examples of materials capable of lithium conversion include sulfur, $LiO_2$, $FeF_2$ and $FeF_3$, Si, aluminum, tin, SnCo, $Fe_3O_4$, and combinations thereof.

The electrochemically active material may comprise a material for use as an active material for a negative electrode. The electrochemically active material for a negative electrode may comprise graphite, lithium titanate (LTO), lithium vanadium phosphate (LVP), silicon, silicon compounds, tin, tin compounds, sulfur, sulfur compounds, lithium metal, graphene, or a combination thereof.

The electrochemically active material may be present in the electrodepositable coating composition in an amount of at least 45% by weight, such as at least 70% by weight, such as at least 80% by weight, such as at least 90% by weight, such as at least 91% by weight, and may be present in an amount of no more than 99% by weight, such as no more than 98% by weight, such as no more than 95% by weight, based on the total solids weight of the electrodepositable composition. The electrochemically active material may be present in the electrodepositable coating composition in amount of 45% to 99% by weight, such as 70% to 98% by weight, such as 80% to 95% by weight, such as 90% to 95% by weight, such as 91% to 95% by weight, based on the total solids weight of the electrodepositable coating composition.

The electrodepositable coating composition of the present invention may optionally further comprise an electrically conductive agent. Non-limiting examples of electrically conductive agents include carbonaceous materials such as, activated carbon, carbon black such as acetylene black and furnace black, graphite, graphene, carbon nanotubes, carbon fibers, fullerene, and combinations thereof. It should be noted graphite may be used as both an electrochemically active material for negative electrodes as well as an electrically conductive agent, but an electrically conductive material is typically omitted when graphite is used as the electrochemically active material.

The electrically conductive agent may also comprise any active carbon that has a high-surface area, such as a BET surface area of greater than 100 m$^2$/g. As used herein, the term "BET surface area" refers to a specific surface area determined by nitrogen adsorption according to the ASTM D 3663-78 standard based on the Brunauer-Emmett-Teller method described in the periodical "The Journal of the American Chemical Society", 60, 309 (1938). In some examples, the conductive carbon can have a BET surface area of 100 m$^2$/g to 1,000 m$^2$/g, such as 150 m$^2$/g to 600 m$^2$/g, such as 100 m$^2$/g to 400 m$^2$/g, such as 200 m$^2$/g to 400 m$^2$/g. In some examples, the conductive carbon can have a BET surface area of about 200 m$^2$/g. A suitable conductive carbon material is LITX 200 commercially available from Cabot Corporation.

The electrically conductive agent may be present in the electrodepositable coating composition in amounts of 0.5% to 20% by weight, such as 1% to 20% by weight, such as 2% to 10% by weight, such as 2.5% to 7% by weight, such as 3% to 5% by weight, based on the total solids weight of the electrodepositable coating composition.

As mentioned above, the binder may optionally further comprise a crosslinking agent. The crosslinking agent should be soluble or dispersible in the aqueous medium and be reactive with active hydrogen groups of the pH-dependent rheology modifier and any other resinous film-forming polymers optionally present in the composition. Non-limiting examples of suitable crosslinking agents include aminoplast resins, blocked polyisocyanates, carbodiimide, and polyepoxides.

Examples of aminoplast resins for use as a crossslinking agent are those which are formed by reacting a triazine such as melamine or benzoguanamine with formaldehyde. These reaction products contain reactive N-methylol groups. Usually, these reactive groups are etherified with methanol, ethanol or butanol including mixtures thereof to moderate their reactivity. For the chemistry preparation and use of aminoplast resins, see "The Chemistry and Applications of Amino Crosslinking Agents or Aminoplast", Vol. V, Part II, page 21 ff., edited by Dr. Oldring; John Wiley & Sons/Cita Technology Limited, London, 1998. These resins are commercially available under the trademark MAPRENAL® such as MAPRENAL MF980 and under the trademark CYMEL® such as CYMEL 303 and CYMEL 1128, available from Cytec Industries.

Blocked polyisocyanate crosslinking agents are typically diisocyanates such as toluene diisocyanate, 1,6-hexamethylene diisocyanate and isophorone diisocyanate including isocyanato dimers and trimers thereof in which the isocyanate groups are reacted ("blocked") with a material such as epsilon-caprolactam and methylethyl ketoxime. At curing temperatures, the blocking agents unblock exposing isocyanate functionality that is reactive with the hydroxyl functionality associated with the (meth)acrylic polymer. Blocked polyisocyanate crosslinking agents are commercially available from Covestro as DESMODUR BL.

Carbodiimide crosslinking agents may be in monomeric or polymeric form, or a mixture thereof. Carbodiimide crosslinking agents refer to compounds having the following structure:

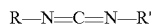

wherein R and R' may each individually comprise an aliphatic, aromatic, alkylaromatic, carboxylic, or heterocyclic group. Examples of commercially available carbodiimide crosslinking agents include, for example, those sold under the trade name CARBODILITE available from Nisshinbo Chemical Inc., such as CARBODILITE V-02-L2, CARBODILITE SV-02, CARBODILITE E-02, CARBODILITE SW-12G, CARBODILITE V-10 and CARBODILITE E-05.

Examples of polyepoxide crosslinking agents are epoxy-containing (meth)acrylic polymers such as those prepared from glycidyl methacrylate copolymerized with other vinyl monomers, polyglycidyl ethers of polyhydric phenols such as the diglycidyl ether of bisphenol A; and cycloaliphatic polyepoxides such as 3,4-epoxycyclohexylmethyl-3,4-epoxycyclohexane carboxylate and bis(3,4-epoxy-6-methylcyclohexyl-methyl) adipate.

The crosslinking agent may be present in the electrodepositable coating composition in amounts of 0% to 30% by weight, such as 5% to 20% by weight, such as 5% to 15% by weight, such as 7% to 12% by weight, the % by weight being based on the total weight of the binder solids.

The crosslinking agent may be present in the electrodepositable coating composition in amounts of 0% to 2% by weight, such as 0.1% to 1% by weight, such as 0.2% to 0.8% by weight, such as 0.3% to 0.5% by weight, the % by weight being based on the total solids weight of the electrodepositable coating composition.

As used herein, the term "binder solids" may be used synonymously with "resin solids" and includes the pH-dependent rheology modifier, and, if present, the crosslinking agent, the non-fluorinated organic film-forming polymer, and the adhesion promoter. As used herein, the term "binder dispersion" refers to a dispersion of the binder solids in the aqueous medium.

The binder may comprise, consist essentially of, or consist of the pH-dependent rheology modifier in an amount of 10% to 100% by weight, such as 50% to 95% by weight, such as 70% to 93% by weight, such as 87% to 92% by weight; and the crosslinking agent, if present, in amounts of 0% to 30% by weight, such as 5% to 15% by weight, such as 7% to 13% by weight, the % by weight being based on the total weight of the binder solids.

The binder may optionally further comprise a non-fluorinated organic film-forming polymer. The non-fluorinated organic film-forming polymer is different than the pH-dependent rheology modifier described herein. The non-fluorinated organic film-forming polymer may comprise polysaccharides, polyacrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, xanthan gum, or combinations thereof.

The non-fluorinated organic film-forming polymer may be present, if at all, in an amount of 0% to 90% by weight, such as 20% to 60% by weight, such as 25% to 40% by weight, based on the total weight of the binder solids.

The non-fluorinated organic film-forming polymer may be present, if at all, in an amount of at least 0% to 9.9% by weight, such as 0.1% to 5% by weight, such as 0.2% to 2% by weight, such as 0.3% to 0.5% by weight, based on the total solids weight of the electrodepositable coating composition.

The electrodepositable coating composition may also be substantially free, essentially free, or completely free of any or all of the non-fluorinated organic film-forming polymer described herein.

The binder solids may be present in the electrodepositable coating composition in amounts of 0.1% to 20% by weight, such as 0.2% to 10% by weight, such as 0.3% to 8% by weight, such as 0.5% to 5% by weight, such as 1% to 3% by weight, such as 1.5% to 2.5% by weight, such as 1% to 2% by weight, based on the total solids weight of the electrodepositable coating composition.

The total solids of the electrodepositable coating composition may be at least 0.1% by weight, such as at least 1% by weight, such as at least 3% by weight, such as at least 5% by weight, such as at least 7% by weight, such as at least 10% by weight, such as at least 20% by weight, such as at least 30% by weight, such as at least 40% by weight, and may be no more than 60% by weight, such as no more than 50% by weight, such as no more than 40% by weight, such as no more than 30% by weight, such as no more than 25% by weight, such as no more than 20% by weight, such as no more than 15% by weight, such as no more than 12% by weight, such as no more than 10% by weight, such as no more than 7% by weight, such as no more than 5% by weight, based on the total weight of the electrodepositable coating composition. The total solids of the electrodepositable coating composition may be 0.1% to 60% by weight, such as 0.1% to 50% by weight, such as 0.1% to 40% by weight, such as 0.1% to 30% by weight, such as 0.1% to 25% by weight, such as 0.1% to 20% by weight, such as 0.1% to 15% by weight, such as 0.1% to 12% by weight, such as 0.1% to 10% by weight, such as 0.1% to 7% by weight, such as 0.1% to 5% by weight, such as 1% to 60% by weight, such as 1% to 50% by weight, such as 1% to 40% by weight, such as 1% to 30% by weight, such as 1% to 25% by weight, such as 1% to 20% by weight, such as 1% to 15% by weight, such as 1% to 12% by weight, such as 1% to 10% by weight, such as 1% to 7% by weight, such as 1% to 5% by weight based on the total weight of the electrodepositable coating composition.

The electrodepositable coating composition may comprise, consist essentially of, or consist of the electrochemically active material in an amount of 45% to 99% by weight, such as 70% to 98% by weight, such as 80% to 95% by weight, such as 90% to 95% by weight, such as 91% to 95% by weight; the electrically conductive agent in an amount of 0.5% to 20% by weight, such as 1% to 20% by weight, such as 2% to 10% by weight, such as 2.5% to 7% by weight, such as 3% to 5% by weight; and the pH-dependent rheology modifier in an amount of 0.1% to 10% by weight, such as 0.2% to 10% by weight, such as 0.3% to 10% by weight, such as 1% to 7% by weight, such as 1.5% to 5% by weight, such as 2% to 4.5% by weight, such as 3% to 4% by weight; and optionally the crosslinking agent in an amount of 0% to 2% by weight, such as 0.1% to 1% by weight, such as 0.2% to 0.8% by weight, such as 0.3% to 0.5% by weight; the non-fluorinated organic film-forming polymer in an amount of at least 0% to 9.9% by weight, such as 0.1% to 5% by weight, such as 0.2% to 2% by weight, such as 0.3% to 0.5% by weight, based on the total solids weight of the electrodepositable coating composition; and water in an amount of 40% to 99% by weight, such as 45% to 99% by weight, such as 50% to 99% by weight, such as 60% to 99% by weight, such as 65% to 99% by weight, such as 70% to 99% by weight, such as 75% to 99% by weight, such as 80% to 99% by weight, such as 85% to 99% by weight, such as 90% to 99% by weight, such as 40% to 90% by weight, such as 45% to 85% by weight, such as 50% to 80% by weight, such as 60% to 75% by weight, based on the total weight of the electrodepositable coating composition.

The electrodepositable coating composition may optionally further comprise an adhesion promoter. The adhesion promoter may comprise an acid-functional polyolefin or a thermoplastic material.

The acid-functional polyolefin adhesion promoter may comprise an ethylene-(meth)acrylic acid copolymer, such as an ethylene-acrylic acid copolymer or an ethylene-methacrylic acid copolymer. The ethylene-acrylic acid copolymer may comprise constitutional units comprising 10% to 50% by weight acrylic acid, such as 15% to 30% by weight, such as 17% to 25% by weight, such as about 20% by weight, based on the total weight of the ethylene-acrylic acid copolymer, and 50% to 90% by weight ethylene, such as 70% to 85% by weight, such as 75% to 83% by weight, such as about 80% by weight, based on the total weight of the ethylene-acrylic acid copolymer. A commercially available example of such an addition polymer includes PRIMACOR 5980i, available from the Dow Chemical Company.

The adhesion promoter may be present in the electrodepositable coating composition in an amount of 1% to 60% by weight, such as 10% to 40% by weight, such as 25% to 35% by weight, based on the total weight of the binder solids (including the adhesion promoter).

The electrodepositable coating composition may optionally further comprise a pH adjustment agent. The pH adjustment agent may comprise an acid or base. The acid may comprise, for example, phosphoric acid or carbonic acid. The base may comprise, for example, lithium hydroxide, lithium carbonate, or dimethylethanolamine (DMEA). Any suitable amount of pH adjustment agent needed to adjust the pH of the electrodepositable coating composition to the desired pH range may be used.

The present invention is also directed to an electrodepositable coating composition comprising, consisting essentially of, or consisting of (a) a pH-dependent rheology modifier; (b) an electrically conductive agent; and (c) an aqueous medium comprising water; wherein water is present in an amount of at least 40% by weight, based on the total weight of the electrodepositable coating composition. The pH-dependent rheology, the crosslinking agent, and the aqueous medium may be the same materials and present in the same amounts as described above.

The electrically conductive agent may be the same as those described above. The electrically conductive agent may be present in the electrodepositable coating composition in an amount of at least 45% by weight, such as at least 70% by weight, such as at least 80% by weight, such as at least 90% by weight, such as at least 91% by weight, and may be present in an amount of no more than 99% by weight, such as no more than 98% by weight, such as no more than 95% by weight, based on the total solids weight of the electrodepositable composition. The electrically conductive agent may be present in the electrodepositable coating composition in amount of 45% to 99% by weight, such as 70% to 98% by weight, such as 80% to 95% by weight, such as 90% to 95% by weight, such as 91% to 95% by weight, based on the total solids weight of the electrodepositable coating composition.

The electrodepositable coating composition comprising, consisting essentially of, or consisting of (a) the pH-dependent rheology modifier; (b) the electrically conductive agent; and (d) the aqueous medium comprising water may further comprise the optional ingredients described above, including the crosslinking agent, non-fluorinated organic film-forming polymer, adhesion promoter and pH adjustment agent, in the amounts as described above.

The present invention is also directed to methods for coating a substrate. The electrodepositable coating composition may be electrodeposited upon any electrically conductive substrate. Suitable substrates include metal substrates, metal alloy substrates, and/or substrates that have been metallized, such as nickel-plated plastic. Additionally, substrates may comprise non-metal conductive materials including composite materials such as, for example, materials comprising carbon fibers or conductive carbon. According to the present invention, the metal or metal alloy may comprise cold rolled steel, hot rolled steel, steel coated with zinc metal, zinc compounds, or zinc alloys, such as electrogalvanized steel, hot-dipped galvanized steel, galvanealed steel, and steel plated with zinc alloy. Aluminum alloys of the 1XXX, 2XXX, 3XXX, 4XXX, 5XXX, 6XXX, 7XXX or 8XXX series as well as clad aluminum alloys and cast aluminum alloys of the A356 series also may be used as the substrate. Magnesium alloys of the AZ31B, AZ91C, AM60B, or EV31A series also may be used as the substrate. The substrate used in the present invention may also comprise titanium and/or titanium alloys. Other suitable non-ferrous metals include copper and magnesium, as well as alloys of these materials. The substrate may be in the form of a current collector comprising a conductive material, and the conductive material may comprise a metal such as iron, copper, aluminum, nickel, and alloys thereof, as well as stainless steel. Other suitable conductive substrates include conductive carbon; a material coated with a conductive primer; a pre-made battery electrode for preparation of a multi-layered battery electrode; an electrically conductive porous polymer; and a porous polymer comprising a conductive composite. The substrate may also comprise an electrically insulating porous polymer wherein the substrate is coated using a conductive backing, such as, for example, by the method and with the apparatus disclosed in U.S. Publication No. 2016/0317974 at paragraphs [0054] to [0058].

The method for coating a substrate may comprise electrodepositing an electrodepositable coating composition as described above to at least a portion of the substrate and at least partially curing the coating composition to form an at least partially cured coating on the substrate. According to the present invention, the method may comprise (a) electrodepositing onto at least a portion of the substrate an electrodepositable coating composition of the present invention and (b) heating the coated substrate to a temperature and for a time sufficient to cure the electrodeposited coating on the substrate.

In the methods of the present invention, a coating is applied onto or over at least a portion of the substrate via an electrodeposition process. In such a process, an electrically conductive substrate (such as any of those described earlier) serving as an electrode (such as an anode in anionic electrodeposition) in an electrical circuit comprising the electrode and a counter-electrode (such as a cathode in anionic electrodeposition) is immersed in the electrodepositable coating composition of the present invention. An electric current is passed between the electrodes to cause the coating to deposit on the substrate. The applied voltage may be varied and can be, for example, as low as one volt to as high as several thousand volts, but is often between 50 and 500 volts. The current density is often between 0.5 ampere and 15 amperes per square foot. The residence time of the substrate in the composition may be from 10 to 180 seconds.

After electrocoating, the substrate is removed from the bath and may be baked in an oven. For example, the coated substrate may be baked at temperatures of 400° C. or lower, such as 300° C. or lower, such as 275° C. or lower, such as 255° C. or lower, such as 225° C. or lower, such as 200° C. or lower, such as 100° C. to 400° C., such as 200° C. to 400° C., such as 240° C. to 300° C., for 10 to 60 minutes. In other cases, after electrocoating and removal of the substrate from the bath, the coated substrate may simply be allowed to dry under ambient conditions. As used herein, "ambient conditions" refers to atmospheric air having a relative humidity of 10 to 100 percent and a temperature in the range of −10 to 120° C., such as 5 to 80° C., in some cases 10 to 60° C. and, in yet other cases, 15 to 40° C.

The present invention is also directed to an electrode comprising an electrical current collector and a film formed on the electrical current collector, wherein the film is deposited from the electrodepositable coating composition described above. The electrode may be a positive electrode or a negative electrode and may be manufactured by depositing the above-described electrodepositable coating composition to the surface of the current collector to form a coating film, and subsequently drying and/or curing the coating film.

The coating film of the electrode may comprise a cross-linked coating. As used herein, the term "cross-linked coating" refers to a coating wherein functional groups of the pH-dependent rheology modifier have reacted with functional groups of the crosslinking agent to form covalent bonds that cross-link the component molecules of the binder. The adhesion promoter and non-fluorinated organic film-forming polymer, if present, may also have functional groups reactive with functional groups of the crosslinking agent and may also serve to cross-link the coating.

The current collector may comprise a conductive material, and the conductive material may comprise a metal such as iron, copper, aluminum, nickel, and alloys thereof, as well as stainless steel. For example, the current collector may comprise aluminum or copper in the form of a mesh, sheet or foil. Although the shape and thickness of the current collector are not particularly limited, the current collector may have a thickness of about 0.001 to 0.5 mm, such as a mesh, sheet or foil having a thickness of about 0.001 to 0.5 mm.

In addition, the current collector may be pretreated with a pretreatment composition prior to depositing the electrodepositable coating composition of the present invention. As used herein, the term "pretreatment composition" refers to a composition that upon contact with the current collector, reacts with and chemically alters the current collector surface and binds to it to form a protective layer. The pretreatment composition may be a pretreatment composition comprising a group TIM and/or IVB metal. As used herein, the term "group TIM and/or IVB metal" refers to an element that is in group IIIB or group IVB of the CAS Periodic Table of the Elements as is shown, for example, in the Handbook of Chemistry and Physics, $63^{rd}$ edition (1983). Where applicable, the metal themselves may be used, however, a group IIIB and/or IVB metal compound may also be used. As used herein, the term "group IIIB and/or IVB metal compound" refers to compounds that include at least one element that is in group IIIB or group IVB of the CAS Periodic Table of the Elements. Suitable pretreatment compositions and methods for pretreating the current collector are described in U.S. Pat. No. 9,273,399 at col. 4, line 60 to col. 10, line 26, the cited portion of which is incorporated herein by reference. The pretreatment composition may be used to treat current collectors used to produce positive electrodes or negative electrodes.

To prepare an electrode for a lithium ion electrical storage device, an electrodepositable coating composition comprising the electrochemically active material, an electrically conductive agent, a binder comprising the pH-dependent rheology modifier, and optional ingredients, is prepared by combining the ingredients to form the electrodepositable coating composition. These substances can be mixed together by agitation with a known means such as a stirrer, bead mill or high-pressure homogenizer. Exemplary methods for preparing such composition are presented in the examples below.

The thickness of the coating formed after electrodeposition may be at least 1 micron, such as 1 to 1,000 microns (μm), such as 10 to 500 μm, such as 50 to 250 μm, such as 75 to 200 μm.

Drying and/or crosslinking the coating film after application, if applicable, can be done, for example, by heating at elevated temperature, such as at least 50° C., such as at least 60° C., such as 50-400° C., such as 100-300° C., such as 150-280° C., such as 200-275° C., such as 225-270° C., such as 235-265° C., such as 240-260° C. The time of heating will depend somewhat on the temperature. Generally, higher temperatures require less time for curing. Typically, curing times are for at least 5 minutes, such as 5 to 60 minutes. The temperature and time should be sufficient such that the binder in the cured film is crosslinked (if applicable), that is, covalent bonds are formed between co-reactive groups on the pH-dependent rheology modifier and non-fluorinated organic film-forming polymer (if present), such as carboxylic acid groups and hydroxyl groups, and the reactive groups of the crosslinking agent, such as N-methylol and/or the N-methylol ether groups of an aminoplast, isocyanato groups of a blocked polyisocyanate crosslinking agent. The crosslinked binder may be substantially solvent resistant to the solvents of the electrolyte mentioned below. Other methods of drying the coating film include ambient temperature drying, microwave drying and infrared drying, and other methods of curing the coating film include e-beam curing and UV curing.

According to the present invention, electrodes produced by electrodeposition using the electrodepositable coating composition of the present invention may have improved adhesion over comparable aqueous coating compositions applied by other methods, such as, for example, casting. For example, the 90° peel strength adhesion of the coating to the substrate may be measured using a Mark-10 (model DC4060) motorized test stand equipped with a mechanically driven 90° peel stage. A 12.7 mm strip of the coated substrate may be cut and anchored to the stage using adhesive tape. Peel strength may be gauged as the force required to delaminate the coating film from the substrate. Lateral movement of the peel stage may be actively driven at the same rate as the vertical movement of the peel head to ensure a 90° peel and provide an accurate and reproducible measure of peel strength. This test method may be referred to herein as PEEL STRENGTH TEST METHOD. The 90° peel strength adhesion may be at least 10% greater than a comparative coating composition at a similar mass loading, such as at least 15% greater, such as at least 20% greater, such as at least 25% greater, such as at least 30% greater, such as at least 40% greater, such as at least 50% greater, such as at least 60% greater, such as at least 70% greater, such as at least 80% greater, such as at least 90% greater, such as at least 100% greater, as measured according to PEEL STRENGTH TEST METHOD. As used herein, the term "comparative coating composition" refers to aqueous compositions that do not include the pH-dependent rheology modifier and otherwise have similar amounts of components as the electrodepositable coating compositions of the present invention. As used herein, the term "at a similar mass loading" refers to a coating having a loading within 0.1 mg/cm$^2$.

The 90° peel strength adhesion may be at least 100 N/m at a mass loading of 2.15 g/cm$^2$, such as at least 125 N/m, such as at least 135 N/m, such as at least 145 N/m, such as at least 155 N/m, such as at least 165 N/m, such as at least 175 N/m, such as at least 180 N/m, as measured according to PEEL STRENGTH TEST METHOD.

The present invention is also directed to an electrical storage device. An electrical storage device according to the present invention may be manufactured by using one or more of the above electrodes prepared from the electrodepositable coating composition of the present invention. The electrical storage device comprises an electrode, a counter electrode and an electrolyte. The electrode, counter-electrode or both may comprise the electrode of the present invention, as long as one electrode is a positive electrode and one electrode is a negative electrode. Electrical storage devices according to the present invention include a cell, a battery, a battery pack, a secondary battery, a capacitor, and a supercapacitor.

The electrical storage device includes an electrolytic solution and can be manufactured by using parts such as a separator in accordance with a commonly used method. As a more specific manufacturing method, a negative electrode and a positive electrode are assembled together with a separator therebetween, the resulting assembly is rolled or bent in accordance with the shape of a battery and put into a battery container, an electrolytic solution is injected into the battery container, and the battery container is sealed up. The shape of the battery may be like a coin, button or sheet, cylindrical, square or flat.

The electrolytic solution may be liquid or gel, and an electrolytic solution which can serve effectively as a battery may be selected from among known electrolytic solutions which are used in electrical storage devices in accordance with the types of a negative electrode active material and a positive electrode active material. The electrolytic solution may be a solution containing an electrolyte dissolved in a suitable solvent. The electrolyte may be conventionally known lithium salt for lithium ion secondary batteries. Examples of the lithium salt include $LiClO_4$, $LiBF_4$, $LiPF_6$, $LiCF_3CO_2$, $LiAsF_6$, $LiSbF_6$, $LiB_{10}Cl_{10}$, $LiAlCl_4$, $LiCl$, $LiBr$, $LiB(C_2H_5)_4$, $LiB(C_6H_5)_4$, $LiCF_3SO_3$, $LiCH3SO_3$, $LiC_4F_9SO_3$, $Li(CF_3SO_2)_2N$, $LiB_4CH_3SO_3Li$ and $CF_3SO_3Li$. The solvent for dissolving the above electrolyte is not particularly limited and examples thereof include carbonate compounds such as propylene carbonate, ethylene carbonate, butylene carbonate, dimethyl carbonate, methyl ethyl carbonate and diethyl carbonate; lactone compounds such as γ-butyl lactone; ether compounds such as trimethoxymethane, 1,2-dimethoxyethane, diethyl ether, 2-ethoxyethane, tetrahydrofuran and 2-methyltetrahydrofuran; and sulfoxide compounds such as dimethyl sulfoxide. The concentration of the electrolyte in the electrolytic solution may be 0.5 to 3.0 mole/L, such as 0.7 to 2.0 mole/L.

During discharge of a lithium ion electrical storage device, lithium ions may be released from the negative electrode and carry the current to the positive electrode. This process may include the process known as deintercalation. During charging, the lithium ions migrate from the electrochemically active material in the positive electrode to the negative electrode where they become embedded in the electrochemically active material present in the negative electrode. This process may include the process known as intercalation.

The electrodepositable coating composition may be substantially free, essentially free, or completely free of fugitive adhesion promoter. As used herein, the term "fugitive adhesion promoter" refers to N-methyl-2-pyrrolidone (NMP), dimethylformamide, N,N-dimethylacetamide, dimethylsulfoxide (DMSO), hexamethylphosphamide, dioxane, tetrahydrofuran, tetramethylurea, triethyl phosphate, trimethyl phosphate, dimethyl succinate, diethyl succinate and tetraethyl urea. As used herein, an electrodepositable coating composition substantially free of fugitive adhesion promoter includes less than 1% by weight fugitive adhesion promoter, if any at all, based on the total weight of the electrodepositable coating composition. As used herein, an electrodepositable coating composition essentially free of fugitive adhesion promoter includes less than 0.1% by weight fugitive adhesion promoter, if any at all, based on the total weight of the electrodepositable coating composition. When present, the fugitive adhesion promoter may be present in an amount of less than 1% by weight, such as less than 0.9% by weight, such as less than 0.1% by weight, such as less than 0.01% by weight, such as less than 0.001% by weight, based on the total weight of the electrodepositable coating composition. When present, the fugitive adhesion promoter may be present in an amount of less than 2% by weight, such as less than 1% by weight, such as less than 0.1% by weight, such as less than 0.01% by weight, such as less than 0.001% by weight, based on the total solids weight of the electrodepositable coating composition.

According to the present invention, the electrodepositable coating composition may be substantially free, essentially free or completely free of fluoropolymer. As used herein, the term fluoropolymer refers to polymers and copolymers comprising the residue of vinylidene fluoride, such as, for example, polyvinylidene fluoride (PVDF). As used herein, the "polyvinylidene fluoride polymer" includes homopolymers, copolymers, such as binary copolymers, and terpolymers, including high molecular weight homopolymers, copolymers, and terpolymers. Such (co)polymers include those containing at least 50 mole percent, such as at least 75 mole %, and at least 80 mole %, and at least 85 mole % of the residue of vinylidene fluoride (also known as vinylidene difluoride). The vinylidene fluoride monomer may be copolymerized with at least one comonomer selected from the group consisting of tetrafluoroethylene, trifluoroethylene, chlorotrifluoroethylene, hexafluoropropene, vinyl fluoride, pentafluoropropene, tetrafluoropropene, perfluoromethyl vinyl ether, perfluoropropyl vinyl ether and any other monomer that would readily copolymerize with vinylidene fluoride in order to produce the fluoropolymer of the present invention. The fluoropolymer may also comprise a PVDF homopolymer. As used herein, the electrodepositable coating composition is substantially free or essentially free of fluoropolymer when fluoropolymer is present, if at all, in an amount of less than 5% by weight or less than 0.2% by weight, respectively, based on the total weight of the binder solids.

According to the present invention, the electrodepositable coating composition may be substantially free, essentially free or completely free of polyethylene, polytetrafluoroethylene, tetrafluoroethylene-hexafluoropropylene copolymer, and/or polyacrylonitrile derivatives.

The electrodepositable coating composition may be substantially free of graphene oxide. As used herein, an electrodepositable composition is substantially free or essentially free of graphene oxide when graphene oxide is present, if at all, in an amount less than 5% by weight or less than 1% by weight, respectively, based on the total solids weight of the electrodepositable coating composition.

The pH-dependent rheology modifier may be substantially free, essentially free, or completely free of the residue of a carboxylic acid amide monomer unit. As used herein, a pH-dependent rheology modifier is substantially free or essentially free of carboxylic acid amide monomer units when carboxylic acid amide monomer units are present, if at all, in an amount less than 0.1% by weight or less than 0.01% by weight, respectively, based on the total weight of the pH-dependent rheology modifier.

The electrodepositable coating may be substantially free, essentially free, or completely free of isophorone.

The electrodepositable coating may be substantially free, essentially free, or completely free of a cellulose derivative. Non-limiting examples of cellulose derivatives includes carboxymethylcellulose and salts thereof (CMC). CMC is a cellulosic ether in which a portion of the hydroxyl groups on the anhydroglucose rings are substituted with carboxymethyl groups.

The electrodepositable coating may be substantially free, essentially free, or completely free of multi-functional hydrazide compounds. As used herein, an electrodepositable composition is substantially free or essentially free of multi-functional hydrazide compounds when multi-functional hydrazide compounds are present, if at all, in an amount less than 0.1% by weight or less than 0.01% by weight, respectively, based on the total binder solids weight of the electrodepositable coating composition.

The electrodepositable coating may be substantially free, essentially free, or completely free of styrene-butadiene rubber (SBR), acrylonitrile butadiene rubber or acrylic rubber. As used herein, an electrodepositable composition is substantially free or essentially free of styrene-butadiene rubber (SBR), acrylonitrile butadiene rubber or acrylic rubber when styrene-butadiene rubber (SBR), acrylonitrile butadiene rubber or acrylic rubber is present, if at all, in an amount less than 5% by weight or less than 1% by weight, respectively, based on the total binder solids weight of the electrodepositable coating composition.

The electrodepositable coating may be substantially free, essentially free, or completely free of poly(meth)acrylic acid having more than 70% by weight (meth)acrylic acid functional monomers, based on the total weight of the poly (meth)acrylic acid. As used herein, an electrodepositable composition is substantially free or essentially free of poly (meth)acrylic acid when poly(meth)acrylic acid is present, if at all, in an amount less than 5% by weight or less than 1% by weight, respectively, based on the total binder solids weight of the electrodepositable coating composition.

The electrodepositable coating composition may be substantially free, essentially free, or completely free of particulate polymers containing the residue of an aliphatic conjugated diene monomer unit and an aromatic vinyl monomer unit. As used herein, an electrodepositable composition is substantially free or essentially free of such particular polymers when the particular polymer is present, if at all, in an amount less than 5% by weight or less than 1% by weight, respectively, based on the total weight of the binder solids.

As used herein, the term "polymer" refers broadly to oligomers and both homopolymers and copolymers. The term "resin" is used interchangeably with "polymer".

The terms "acrylic" and "acrylate" are used interchangeably (unless to do so would alter the intended meaning) and include acrylic acids, anhydrides, and derivatives thereof, such as their $C_1$-$C_5$ alkyl esters, lower alkyl-substituted acrylic acids, e.g., $C_1$-$C_2$ substituted acrylic acids, such as methacrylic acid, 2-ethylacrylic acid, etc., and their $C_1$-$C_4$ alkyl esters, unless clearly indicated otherwise. The terms "(meth)acrylic" or "(meth)acrylate" are intended to cover both the acrylic/acrylate and methacrylic/methacrylate forms of the indicated material, e.g., a (meth)acrylate monomer. The term "(meth)acrylic polymer" refers to polymers prepared from one or more (meth)acrylic monomers.

As used herein molecular weights are determined by gel permeation chromatography using a polystyrene standard. Unless otherwise indicated molecular weights are on a weight average basis.

The term "glass transition temperature" is a theoretical value being the glass transition temperature as calculated by the method of Fox on the basis of monomer composition of the monomer charge according to T. G. Fox, Bull. Am. Phys. Soc. (Ser. II) 1, 123 (1956) and J. Brandrup, E. H. Immergut, Polymer Handbook 3$^{rd}$ edition, John Wiley, New York, 1989.

As used herein, unless otherwise defined, the term "substantially free" means that the component is present, if at all, in an amount of less than 5% by weight, based on the total weight of the electrodepositable coating composition.

As used herein, unless otherwise defined, the term "essentially free" means that the component is present, if at all, in an amount of less than 1% by weight, based on the total weight of the electrodepositable coating composition.

As used herein, unless otherwise defined, the term "completely free" means that the component is not present in the electrodepositable coating composition, i.e., 0.00% by weight, based on the total weight of the electrodepositable coating composition.

As used herein, the term "total solids" refers to the non-volatile components of the electrodepositable coating composition of the present invention and specifically excludes the aqueous medium. The total solids include at least the binder, electrochemically active material and/or electrically conductive agent, adhesion promoter, and crosslinking agent, if present.

For purposes of the detailed description, it is to be understood that the invention may assume various alternative variations and step sequences, except where expressly specified to the contrary. Moreover, other than in any operating examples, or where otherwise indicated, all numbers such as those expressing values, amounts, percentages, ranges, subranges and fractions may be read as if prefaced by the word "about", even if the term does not expressly appear. Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Where a closed or open-ended numerical range is described herein, all numbers, values, amounts, percentages, subranges and fractions within or encompassed by the numerical range are to be considered as being specifically included in and belonging to the original disclosure of this application as if these numbers, values, amounts, percentages, subranges and fractions had been explicitly written out in their entirety.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

As used herein, unless indicated otherwise, a plural term can encompass its singular counterpart and vice versa, unless indicated otherwise. For example, although reference is made herein to "an" electrochemically active material, "an" electrically conductive agent, "a" pH-dependent rheology modifier, "a" crosslinking agent, a combination (i.e., a plurality) of these components can be used. In addition, in this application, the use of "or" means "and/or" unless specifically stated otherwise, even though "and/or" may be explicitly used in certain instances.

As used herein, "including", "containing" and like terms are understood in the context of this application to be synonymous with "comprising" and are therefore open-ended and do not exclude the presence of additional undescribed or unrecited elements, materials, ingredients or method steps. As used herein, "consisting of" is understood in the context of this application to exclude the presence of any unspecified element, ingredient or method step. As used herein, "consisting essentially of" is understood in the context of this application to include the specified elements, materials, ingredients or method steps "and those that do not materially affect the basic and novel characteristic(s)" of what is being described.

As used herein, the terms "on", "onto", "applied on", "applied onto", "formed on", "deposited on", "deposited onto", mean formed, overlaid, deposited, or provided on but not necessarily in contact with the surface. For example, an electrodepositable coating composition "deposited onto" a substrate does not preclude the presence of one or more other intervening coating layers of the same or different composition located between the electrodepositable coating composition and the substrate.

Whereas specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

Aspects

In view of the foregoing, the present invention thus relates inter alia, without being limited thereto, to the following aspects:

1. An electrodepositable coating composition comprising:
   a binder comprising a pH-dependent rheology modifier comprising the residue of a crosslinking monomer and/or a monoethylenically unsaturated alkylated alkoxylate monomer;
   an electrochemically active material and/or an electrically conductive agent; and
   an aqueous medium.

2. The electrodepositable coating composition of Aspect 1, wherein the pH-dependent rheology modifier comprises an alkali-swellable rheology modifier, a hydrophobically modified alkali-swellable rheology modifier, or a star polymer.

3. The electrodepositable coating composition of Aspect 2, wherein a composition of water and the alkali-swellable rheology modifier at 4.25% by weight of the total composition may have an increase in viscosity of at least 500 cps over an increase in pH value of 3 pH unit over a pH range of 3 to 12, as measured using a Brookfield viscometer using a #4 spindle and operated at 20 RPMs.

4. The electrodepositable coating composition of any one of Aspects 1-3, wherein the pH-dependent rheology modifier comprises a crosslinked alkali-swellable rheology modifier comprising the residue of the crosslinking monomer.

5. The electrodepositable coating composition of Aspect 4, wherein the crosslinked alkali-swellable rheology modifier comprises constitutional units comprising the residue of a monoethylenically unsaturated carboxylic acid, a $C_1$ to $C_6$ alkyl (meth)acrylate monomer, and the crosslinking monomer.

6. The electrodepositable coating composition of Aspect 5, wherein the crosslinked alkali-swellable rheology modifier comprises constitutional units comprising the residue of:
   20 to 65% by weight of the monoethylenically unsaturated carboxylic acid;
   20 to 80% by weight of the $C_1$ to $C_6$ alkyl (meth)acrylate monomer; and
   0.1 to 3% by weight of the crosslinking monomer, based on the total weight of the crosslinked alkali-swellable rheology modifier.

7. The electrodepositable coating composition of any one of Aspects 1-3, wherein the pH-dependent rheology modifier comprises a hydrophobically modified alkali-swellable rheology modifier comprising the residue of the monoethylenically unsaturated alkyl alkoxylate monomer.

8. The electrodepositable coating composition of any one of Aspects 1-3 or 7, wherein the hydrophobically modified alkali-swellable rheology modifier comprises constitutional units comprising the residue of a monoethylenically unsaturated carboxylic acid; a $C_1$ to $C_6$ alkyl (meth)acrylate monomer; and the monoethylenically unsaturated alkyl alkoxylate monomer.

9. The electrodepositable coating composition of Aspect 8, wherein the hydrophobically modified alkali-swellable rheology modifier comprises constitutional units comprising the residue of:
2 to 70% by weight of the monoethylenically unsaturated carboxylic acid;
20 to 80% by weight of the $C_1$ to $C_6$ alkyl (meth)acrylate monomer; and
0.5 to 60% by weight of the monoethylenically unsaturated alkyl alkoxylate monomer, based on the total weight of the hydrophobically modified alkali-swellable rheology modifier.

10. The electrodepositable coating composition of any one of Aspects 1-6, wherein the crosslinking monomer comprises monomers having at least two ethylenically unsaturated groups per monomer.

11. The electrodepositable coating composition of Aspect 1, wherein the pH-dependent rheology modifier comprises an acid-swellable rheology modifier.

12. The electrodepositable coating composition of any one of the preceding Aspects, further comprising a crosslinking agent.

13. The electrodepositable coating composition of Aspect 12, wherein the crosslinking agent comprises carbodiimide.

14. The electrodepositable coating composition of any one of the preceding Aspects, wherein the binder further comprises a non-fluorinated organic film-forming polymer.

15. The electrodepositable coating composition of Aspect 14, wherein the non-fluorinated organic film-forming polymer comprises polysaccharides, polyacrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, xanthan gum, or combinations thereof.

16. The electrodepositable coating composition of any one of the preceding Aspects, wherein the electrochemically active material comprises a positive electrode active material comprising $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, sulfur, $LiO_2$, $FeF_2$ and $FeF_3$, Si, aluminum, tin, SnCo, $Fe_3O_4$, or combinations thereof; or a negative electrode active material comprising graphite, lithium titanate, lithium vanadium phosphate, silicon, silicon compounds, tin, tin compounds, sulfur, sulfur compounds, lithium metal, graphene, or a combination thereof.

17. The electrodepositable coating composition of any one of the preceding Aspects, wherein the electrically conductive agent comprises conductive carbon black, carbon nanotubes, graphene, graphite, carbon fibers, fullerenes, and combinations thereof.

18. The electrodepositable coating composition of any one of the preceding Aspects, wherein the electrodepositable coating composition comprises:
(a) 0.1% to 10% by weight of the pH-dependent rheology modifier;
(b) 0.02% to 2% by weight of the crosslinking agent;
(c) 45% to 99% by weight of the electrochemically active material;
(d) optionally 0.5% to 20% by weight of the electrically conductive agent; and
(e) optionally 0.1% to 9.9% by weight of a non-fluorinated organic film-forming polymer; the % by weight based on the total solids weight of the electrodepositable composition.

19. The electrodepositable coating composition of any one of the preceding Aspects, wherein the VOC of the electrodepositable coating composition is no more than 500 g/L.

20. The electrodepositable coating composition of any one of the preceding Aspects, wherein a coating produced on the substrate by electrodeposition of the electrodepositable coating composition of any one of Aspects 1-13 has a 90° peel strength at least 10% greater than a coating produced from a comparative coating composition at a similar mass loading that is not applied by electrodeposition, the 90° peel strength measured according to PEEL STRENGTH TEST METHOD.

21. The electrodepositable coating composition of any one of the preceding Aspects, wherein a coating produced on the substrate by electrocoating the electrodepositable coating composition of any one of Aspects 1-19 has a 90° peel strength of at least 100 N/m at a mass loading of 2.15 mg/cm$^2$, as measured according to PEEL STRENGTH TEST METHOD.

22. The electrodepositable coating composition of any one of the preceding Aspects, wherein the electrodepositable coating composition is substantially free of fluoropolymer.

23. The electrodepositable coating composition of any one of the preceding Aspects, wherein the binder consists essentially of the pH-dependent rheology modifier and the carbodiimide crosslinking agent.

24. The electrodepositable coating composition of any one of the preceding Aspects, wherein the electrodepositable coating composition is substantially free of cellulose-based materials, polyvinyl alcohol, polycarboxylic acid, and salts thereof.

25. The electrodepositable coating composition of any one of the preceding Aspects, wherein the electrodepositable coating composition is substantially free of multi-functional hydrazide compounds.

26. The electrodepositable coating composition of any one of the preceding Aspects, wherein the electrodepositable coating composition is substantially free of particulate polymers containing the residue of an aliphatic conjugated diene monomer unit and an aromatic vinyl monomer unit.

27. The electrodepositable coating composition of any one of the preceding Aspects, wherein the pH-dependent rheology modifier is substantially free of amide, glycidyl and hydroxyl groups.

28. The electrodepositable coating composition of any one of the preceding Aspects, wherein the pH-dependent rheology modifier is substantially free of the residue of constitutional units comprising aromatic vinyl monomers.

29. A method of coating a substrate comprising:
electrocoating an electrodepositable coating composition onto the substrate, the electrodepositable coating composition comprising:
a binder comprising a pH-dependent rheology modifier;
an electrochemically active material and/or an electrically conductive agent; and
an aqueous medium.

30. The method of Aspect 29, wherein the binder further comprises a non-fluorinated organic film-forming polymer.

31. The method of Aspect 30, wherein the non-fluorinated organic film-forming polymer comprises polysaccharides, polyacrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, xanthan gum, or combinations thereof.

32. The method of Aspect 24 or Aspect 25, wherein the binder comprises:

5% to 99% by weight of the pH-dependent rheology modifier; and

1% to 94% by weight of the non-fluorinated organic film-forming polymer, based on the total weight of the binder.

33. The method of any one of Aspects 29-32, wherein the binder further comprises a crosslinking agent.

34. The method of Aspect 33, wherein the crosslinking agent comprises a carbodiimide, aminoplast, oxazaline, polyisocyanate, or combinations thereof.

35. The method of any one of Aspects 29-34, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, or a combination thereof.

36. The method of any one of Aspects 29-34, wherein the electrochemically active material comprises sulfur, $LiO_2$, $FeF_2$ and $FeF_3$, Si, aluminum, tin, SnCo, $Fe_3O_4$, or combinations thereof.

37. The method of any one of Aspects 29-34, wherein the electrochemically active material comprises graphite, lithium titanate, lithium vanadium phosphate, silicon, silicon compounds, tin, tin compounds, sulfur, sulfur compounds, lithium metal, graphene, or a combination thereof.

38. The method of any one of Aspects 29-37, wherein the pH-dependent rheology modifier comprises an alkali-swellable rheology modifier.

39. The method of Aspect 38, wherein a composition of water and the alkali-swellable rheology modifier at 4.25% by weight of the total composition may have an increase in viscosity of at least 500 cps over an increase in pH value of 3 pH units within the pH range of 3 to 12, as measured using a Brookfield viscometer using a #4 spindle and operated at 20 RPMs.

40. The method of any one of Aspects 29-37, wherein the pH-dependent rheology modifier comprises an acid-swellable rheology modifier.

41. The method of any one of Aspects 29-40, wherein the electrically conductive agent comprises conductive carbon black, carbon nanotubes, graphene, graphite, carbon fibers, fullerenes, and combinations thereof.

42. The method of any one of Aspects 29-41, wherein the electrodepositable coating composition comprises:

(a) 0.1% to 10% by weight of the pH-dependent rheology modifier;

(b) 45% to 99% by weight of the electrochemically active material;

(c) optionally 0.5% to 20% by weight of the electrically conductive agent;

(d) optionally 0.02% to 2% by weight of a crosslinking agent; and (e) optionally 0.1% to 10% by weight of a non-fluorinated organic film-forming polymer; the % by weight based on the total solids weight of the electrodepositable composition.

43. The method of any one of Aspects 29-42, wherein the VOC of the electrodepositable coating composition is no more than 500 g/L.

44. The method of any one of Aspects 29-43, wherein a coating produced on the substrate by the method of any one of Aspects 23-37 has a 90° peel strength at least 10% greater than a coating produced from a comparative coating composition at a similar mass loading that is not applied by electrodeposition, the 90° peel strength measured according to PEEL STRENGTH TEST METHOD.

45. The method of any one of Aspects 29-43, wherein a coating produced on the substrate by the method of any one of Aspects 23-38 has a 90° peel strength of at least 100 N/m at a mass loading of at least 2.15 mg/cm$^2$, as measured according to PEEL STRENGTH TEST METHOD.

46. The method of any one of Aspects 29-43, wherein the method has a mass deposition rate of the electrodepositable coating composition of at least 0.04 mg/cm$^2$/s when electrocoated using an applied voltage of 30V and a separation of 2.7 cm between a counter electrode and the substrate.

47. The method of any one of Aspects 29-46, wherein the electrodepositable coating composition is substantially free of fluoropolymer.

48. The method of coating a substrate according to any one of Aspects 29-47 wherein the electrodepositable coating composition is an electrodepositable coating composition of any one of Aspects 1-28.

49. A coated substrate comprising an electrical current collector and a coating formed on at least a portion of the electrical current collector according to the method of any one of Aspects 29-48.

50. The coated substrate of Aspect 49, wherein the electrical current collector comprises aluminum, copper, steel, stainless steel, nickel, conductive carbon, a conductive primer coating, or a porous polymer.

51. The coated substrate of Aspect 49 or Aspect 50, wherein the coated substrate comprises a positive electrode.

52. The coated substrate of Aspect 49 or Aspect 50, wherein the coated substrate comprises a negative electrode.

53. An electrical storage device comprising:

(a) an electrode comprising the coated substrate of any one of Aspects 49-52;

(b) a counter-electrode, and (c) an electrolyte.

54. The electrical storage device of Aspect 53, wherein the electrical storage device comprises a cell.

55. The electrical storage device of Aspect 53, wherein the electrical storage device comprises a battery pack.

56. The electrical storage device of Aspect 53, wherein the electrical storage device comprises a secondary battery.

57. The electrical storage device of Aspect 53, wherein the electrical storage device comprises a capacitor.

58. The electrical storage device of Aspect 53, wherein the electrical storage device comprises a supercapacitor.

Illustrating the invention are the following examples, which, however, are not to be considered as limiting the invention to their details. Unless otherwise indicated, all parts and percentages in the following examples, as well as throughout the specification, are by weight.

Examples

Example 1—Preparation of Electrodepositable Coating Composition and Application by Electrodeposition To a plastic cup was added 10.954 g of the alkali swellable emulsion HASE TT-615 from DOW Chemicals (3.26 g of solid material, 4.0 wt. % of total solids), 5.076 g of ethanol, and 65.9 g of water. This mixture was mixed in a centrifugal mixer at 2000 RPMs for 5 minutes. Next, 75.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 3.26 g of carbon black (SUPER P, from available from Imerys, 4.0 wt. % of total solids) was added to the mixture and mixed in a centrifugal mixer at 2000 RPMs for 5 minutes. Finally, 9.0 g of Hexyl CELLOSOLVE glycol ether from DOW Chemical and 3.0 g of DOWANOL PnB glycol ether from DOW Chemical were added to the composition and mixed in a centrifugal mixer at 2000 RPMs for 5 minutes.

The electrodepositable coating composition was diluted to 10% total solids by the addition of 634.0 g of water under constant stirring. After 30 minutes of stirring, electrocoat was performed. An application of 30V was applied to a 4 cm×6 cm carbon-coated aluminum foil immersed 3 cm into the solution with a separation of 2.7 cm from a 4 cm×6 cm aluminum counter electrode immersed 3 cm into the composition. Constant stirring was maintained during the electrodeposition process. Depositions at 10s, 20s, and 30s yielded a mass deposition rate of 0.18 mg/cm$^2$/s. The coated substrates were baked in a box oven at 60° C. for 15 minutes followed by an additional bake at 246° C. for 10 minutes. The coated substrates were pressed to 35% porosity using a calendar press from Innovative Machine Corporation.

The adhesion of battery coatings to the substrate was measured using a Mark-10 (model DC4060) motorized test stand equipped with a mechanically driven 90° peel stage. A 12.7 mm strip of the film from Example 1 cut and anchored to the stage using adhesive tape. Peel strength was gauged as the force required to delaminate the film from the substrate. Lateral movement of the peel stage is actively driven at the same rate as the vertical movement of the peel head to ensure a 90° peel and provide an accurate and reproducible measure of peel strength. This test method is referred to herein as the PEEL STRENGTH TEST METHOD. The 90° peel strength of the electrocoated film was 26.1 N/m at a mass loading of 3.36 mg/cm$^2$.

Comparative Example 2—Preparation of Coating Composition and Application to Substrate by Drawdown Method To a plastic cup was added 10.954 g of a pH-dependent rheology modifier (ACRYSOL HASE TT-615 from DOW Chemical, 3.26 g of solid material, 4 wt. % of total solids), 5.076 g of ethanol, and 65.9 g of water. This mixture was mixed in a centrifugal mixer at 2000 RPMs for 5 minutes. Next, 75.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 3.26 g of carbon black (SUPER P, from available from Imerys, 4.0 wt. % of total solids) was added to the mixture and mixed in a centrifugal mixer at 2000 RPMs for 5 minutes. Finally, 9.0 g of hexyl CELLOSOLVE glycol ether from DOW Chemical and 3.0 g of DOWANOL PNB glycol ether from DOW Chemical were added and the slurry was mixed in a centrifugal mixer at 2000 RPMs for 5 minutes.

The slurry was cast onto a carbon-coated aluminum foil using an automatic drawdown table with a gap height of 50 Samples were baked in a box oven at 60° C. for 15 minutes followed by an additional bake at 246° C. for 10 minutes. Samples were pressed to 35% porosity using a calendar press from Innovative Machine Corporation.

The coating was tested for adhesion using the same method as in Example 1. The 90° peel strength of the electrocoated film was 14 N/m at a mass loading of 3.05 mg/cm$^2$.

Example 1 and Comparative Example 2 demonstrate a significant improvement in adhesion for a coating applied by electrodeposition over a coating applied by drawdown despite the only difference between the coating compositions of Example 1 and Comparative Example 2 was the formulation and application for an electrocoat in Example 1 in comparison to a formulation and application by drawdown slurry in Comparative Example 2.

Example 3—Preparation of Electrodepositable Coating Composition and Application by Electrodeposition To a plastic cup was added 9.86 g of a pH-dependent rheology modifier (ACRYSOL HASE TT-615 from DOW Chemical, 2.93 g of solid material, 3.6 wt. % of total solids), 5.076 g of ethanol, 65.9 g of water, and 0.815 g of cross-linking agent (CARBODILITE V-02-L2, available from Nisshinbo Chemical Inc., 0.33 g solid material, 0.40 wt. % of total solids). This mixture was mixed in a centrifugal mixer at 2000 RPMs for 5 minutes. Next, 75.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 3.26 g of carbon black (SUPER P, from available from Imerys, 4.0 wt. % of total solids) was added to the mixture and mixed in a centrifugal mixer at 2000 RPMs for 5 minutes. Finally, 9.0 g of Hexyl CELLOSOLVE glycol ether from DOW Chemical and 3.0 g of DOWANOL PnB glycol ether from DOW Chemical were added to the composition and mixed in a centrifugal mixer at 2000 RPMs for 5 minutes.

The composition was diluted to 10% total solids by the addition of 634.0 g of water under constant stirring. After 30 minutes of stirring, electrocoat was performed using the same method as described in Example 1. Depositions at 10s, 20s, and 30s yielded a mass deposition rate of 0.09 mg/cm$^2$/s. Films were baked at a temperature of 245° C. for 10 minutes and pressed to a porosity of 35% using a calendar press from Innovative Machine Corporation.

Coatings at three different mass loadings were tested for adhesion using the same method as in Example 1. The results are included in Table 1 below.

TABLE 1

| Mass (mg/cm$^2$) | Peel Strength (N/m) |
| --- | --- |
| 2.15 | 184 |
| 2.90 | 57 |
| 3.56 | 38 |

Comparative Example 4—Preparation of Coating Composition and Application to Substrate by Drawdown Method To a plastic cup was added 9.86 g of a pH-dependent rheology modifier (ACRYSOL HASE TT-615 from DOW Chemical Co., 2.93 g of solid material, 3.6 wt. % of total solids), 5.076 g of ethanol, 65.9 g of water, and 0.815 g of crosslinking agent (CARBODILITE V-02-L2, available from Nisshinbo Chemical Inc., 0.33 g of solid material, 0.40 wt. % of total solids). This mixture was mixed in a centrifugal mixer at 2000 RPMs for 5 minutes. Next, 75.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 3.26 g of carbon black (SUPER P, from available from Imerys, 4.0 wt. % of total solids) was added to the mixture and mixed in a centrifugal mixer at 2000 RPMs for 5 minutes. Finally, 9.0 g of hexyl CELLOSOLVE from DOW Chemical and 3.0 g of DOWANOL PNB from DOW Chemical was added to the composition and mixed in a centrifugal mixer at 2000 RPMs for 5 minutes. The slurry was cast onto a carbon-coated aluminum foil using an automatic drawdown table with a gap height of 50 µm. Samples were baked in a box oven at 60° C. for 15 minutes followed by an additional bake at 246° C. for 10 minutes. Samples were calendared to 35% porosity.

Coatings at three different mass loadings were tested for adhesion using the same method as in Example 1. The results are included in Table 2 below.

TABLE 2

| mass (mg/cm$^2$) | Peel Strength (N/m) |
| --- | --- |
| 1.75 | 122 |
| 2.02 | 57 |
| 3.2 | 15 |

Adhesion of a coating is expected to decrease as the mass loading of the coating increases. As shown in Tables 1 and 2, the coatings produced by electrodeposition each outperform coatings produced by drawdown in terms of 90° peel strength adhesion for coatings having similar (or even greater) mass loadings. For example, a 2.15 mg/cm$^2$ mass loading coating produced by electrodeposition demonstrated a significant improvement in peel strength relative to a lower loading level of 1.75 mg/cm$^2$ produced by drawdown. Likewise, a coating produced by electrodeposition having a mass loading of 3.56 mg/cm$^2$ possessed a peel strength twice as large as the 3.2 mg/cm$^2$ coating produced by drawdown. These results are despite the only difference between the coating compositions of Example 3 and Comparative Example 4 was the formulation and application for an electrocoat in Example 3 in comparison to a formulation and application by drawdown slurry in Comparative Example 4.

Evaluation of Coated Substrates as Electrodes in a Coin Cell:

Coin cells were fabricated from the positive electrodes produced in Example 1 and Comparative Example 2 paired with a lithium metal negative electrode. A ceramic coated 20 µm thick Celgard separator was used as the separator. The electrolyte was comprised of 1.2 M LiPF$_6$ in EC:EMC at a 3:7 ratio. The coin cell was fabricated using 316 stainless steel casings and pairing a 1 cm diameter positive electrode with a 1.5 cm diameter lithium anode and 60 µl of electrolyte solution. Testing of the batteries was performed on an Arbin battery tester using a single formation step at 0.1C followed by three cycles at each rate specified in Table 3. Battery cycling was characterized by cycling the batteries at 1C after the rate study was completed.

TABLE 3

Battery capacity for half-cell lithium ion batteries cycled at a rate of 0.1 C to 1.6 C and after 50 cycles at 1.0 C.

| Example | Capacity at 0.1 C | Capacity at 0.2 C | Capacity at 0.4 C | Capacity at 0.8 C | Capacity at 1.6 C | Capacity at 1 C after 50 cycles |
| --- | --- | --- | --- | --- | --- | --- |
| 1 | 172 | 169 | 159 | 136 | 102 | 13 |
| 3 | 172 | 168 | 158 | 147 | 125 | 131 |

The data provided in Table 3 demonstrates improved battery performance using the electrode produced by electrodeposition of the electrodepositable coating composition of Example 3 that includes a crosslinking agent over the electrode produced from the electrodepositable coating composition of Example 1 that does not include the crosslinking agent.

Example 5—Preparation of Electrodepositable Coating Composition and Application by Electrodeposition To a plastic cup was added 3.286 g of a pH-dependent rheology modifier (ACRYSOL HASE TT-615 from DOW Chemical, 1.09 g of solid material, 3.6 wt. % of total solids), 23.0 g of water, and 0.272 g of crosslinking agent (CARBODILITE V-02-L2, available from Nisshinbo Chemical Inc., 0.11 g solid material, 0.40 wt. % of total solids). This mixture was mixed in a centrifugal mixer at 2000 RPMs for 5 minutes. Next, 25.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 1.09 g of carbon black (SUPER P, from available from Imerys, 4.0 wt. % of total solids) was added to the mixture and mixed in a centrifugal mixer at 2000 RPMs for 5 minutes. The electrodepositable coating composition was diluted to 10% total solids by the addition of 219.0 g of water under constant stirring. Electrocoat was performed as in Example 1. Depositions at 10s, 20s, and 30s yielded a mass deposition rate of 0.11 mg/cm$^2$/s.

Comparative Example 6—Preparation of Coating Composition and Application to Substrate by Drawdown Method To a plastic cup was added 3.286 g of a pH-dependent rheology modifier (ACRYSOL HASE TT-615 from DOW Chemical, 1.09 g of solid material, 3.6 wt. % of total solids), 23.0 g of water, and 0.272 g of CARBODILITE V-02-L2 (0.40 wt. %) acquired from Nisshinbo Chemical Inc (0.11 g of solid material). This mixture was mixed in a centrifugal mixer at 2000 RPMs for 5 minutes. Next, 25.0 g (92 wt. % of total solids) of Lithium Iron Phosphate cathode material acquired from Gelon was added to the mixture and mixed in centrifugal mixer at 2000 RPMs for 5 minutes. Next, 1.09 g of carbon black (SUPER P, from available from Imerys, 4.0 wt. % of total solids) was added to the mixture and mixed in a centrifugal mixer at 2000 RPMs for 5 minutes. The slurry was cast onto a carbon-coated aluminum foil using an automatic drawdown table with a gap height of 100

Evaluation of Surface Energy:

An electrocoated film from Example 5 using 30s of deposition time and the drawdown film from Comparative Example 6 were evaluated for evaluation of surface energy based upon a water contact angle analysis. Samples were baked in a box oven at 245° C. for 10 minutes prior to the measurement. The contact angle of water was measured using a drop shape analyzer (DSA 100 available from KRUSS GmbH). The measurement procedure was performed according to ASTM D7334-08 with two measurements being collected from three drops, per liquid. A drop volume of 2.0 µL was used. Temperature and humidity at the time of testing were 75° F. and 3%, respectively. The water contact angle of the electrocoated film from Example 5 was 120.7° and the water contact angle of the drawdown film from Comparative Example 6 was 115.5°. The water contact angle analysis indicates that the electrocoated film of Example 5 had a higher surface energy than the film applied by a drawdown method in Comparative Example 6.

Example 7—Preparation of Electrodepositable Coating Composition and Application by Electrodeposition To a plastic cup was added 3.49 g of a pH-dependent rheology modifier (ACRYSOL ASE-60 from DOW Chemical, 0.98 g of solid material, 3.6 wt. % of total solids), 23.0 g of water, and 0.272 g of crosslinking agent (CARBODILITE V-02-L2, available from Nisshinbo Chemical Inc., 0.11 g of solid material, 0.40 wt. % of total solids). This mixture was mixed in a centrifugal mixer at 2000 RPMs for 5 minutes. Next, 25.0 g (92 wt. % of total solids) of Lithium Nickel Manganese Cobalt Oxide ($LiNi_{0.6}Co_{0.2}Mn_{0.2}O_2$, NCM622) positive electrode electrochemically active material acquired from Gelon was added to the mixture and mixed in centrifugal mixer at 2000 RPMs for 5 minutes. Next, 1.09 g of carbon black (SUPER P, from available from Imerys, 4.0 wt. % of total solids) was added to the mixture and mixed in a centrifugal mixer at 2000 RPMs for 5 minutes. The slurry was diluted to 10% total solids by the addition of 219.0 g of water under constant stir. After 30 minutes of stirring, electrocoat was performed according to the procedure of Example 1. Depositions at 10s, 20s, and 30s yielded a mass deposition rate of 0.91 mg/cm²/s.

Example 8—Preparation of a 0 VOC Electrodepositable Coating Composition and Application by Electrodeposition To a plastic cup was added 3.286 g of a pH-dependent rheology modifier (ACRYSOL HASE TT-615 from DOW Chemical, 1.09 g of solid material, 3.6 wt. % of total solids), 23.0 g of water, and 0.272 g of a crosslinking agent (CARBODILITE V-02-L2, available from Nisshinbo Chemical Inc., 0.11 g of solid material, 0.40 wt. % of total solids). This mixture was mixed in a centrifugal mixer at 2000 RPMs for 5 minutes. Next, 25.0 g (92 wt. % of total solids) of Lithium Iron Phosphate positive electrode electrochemically active material acquired from Gelon was added to the mixture and mixed in centrifugal mixer at 2000 RPMs for 5 minutes. Next, 1.09 g of carbon black (SUPER P, from available from Imerys, 4.0 wt. % of total solids) was added to the mixture and mixed in a centrifugal mixer at 2000 RPMs for 5 minutes. The electrodepositable coating composition was diluted to 10% total solids by the addition of 219.0 g of water under constant stirring. After 30 minutes of stirring, electrocoat was performed according to the procedure of Example 1. Depositions at 10s, 20s, and 30s yielded a mass deposition rate of 0.11 mg/cm²/s.

It will be appreciated by skilled artisans that numerous modifications and variations are possible in light of the above disclosure without departing from the broad inventive concepts described and exemplified herein. Accordingly, it is therefore to be understood that the foregoing disclosure is merely illustrative of various exemplary aspects of this application and that numerous modifications and variations can be readily made by skilled artisans which are within the spirit and scope of this application and the accompanying claims.

We claim:

1. An electrodepositable coating composition comprising:
   a binder comprising a film-forming polymer comprising functional groups and a crosslinking agent comprising functional groups reactive with the functional groups of the film-forming polymer, wherein the film-forming polymer comprises a pH-dependent rheology modifier comprising the residue of a crosslinking monomer and/or a monoethylenically unsaturated alkylated alkoxylate monomer;
   an electrochemically active material and/or an electrically conductive agent; and
   an aqueous medium,
   wherein the pH-dependent rheology modifier comprises a crosslinked alkali-swellable rheology modifier comprising constitutional units comprising the residue of:
   20 to 65% by weight of a monoethylenically unsaturated carboxylic acid;
   20 to 80% by weight of a C1 to C6 alkyl (meth)acrylate monomer; and
   0.1 to 3% by weight of a crosslinking monomer, based on the total weight of the crosslinked alkali-swellable rheology modifier.

2. The electrodepositable coating composition of claim 1, wherein a composition of water and the alkali-swellable rheology modifier at 4.25% by weight of the total composition has an increase in viscosity of at least 500 cps over an increase in pH value of 3 pH units within the pH range of 3 to 12, as measured using a Brookfield viscometer using a #4 spindle and operated at 20 RPMs.

3. An electrodepositable coating com position comprising:
   a binder comprising a film-forming polymer comprising functional groups and a crosslinking agent comprising functional groups reactive with the functional groups of the film-forming polymer, wherein the film-forming polymer comprises a pH-dependent rheology modifier comprising the residue of a crosslinking monomer and/or a monoethylenically unsaturated alkylated alkoxylate monomer;
   an electrochemically active material and/or an electrically conductive agent; and
   an aqueous medium,
   wherein the pH-dependent rheology modifier comprises a hydrophobically modified alkali-swellable rheology modifier comprising constitutional units comprising the residue of:
   2 to 70% by weight of a monoethylenically unsaturated carboxylic acid;
   20 to 80% by weight of a $C_1$ to $C_6$ alkyl (meth)acrylate monomer; and
   0.5 to 60% by weight of a monoethylenically unsaturated alkyl alkoxylate monomer, based on the total weight of the hydrophobically modified alkali-swellable rheology modifier.

4. An electrodepositable coating composition comprising:
a binder comprising a film-forming polymer comprising functional groups and a crosslinking agent comprising functional groups reactive with the functional groups of the film-forming polymer, wherein the film-forming polymer comprises a pH-dependent rheology modifier comprising the residue of a crosslinking monomer and/or a monoethylenically unsaturated alkylated alkoxylate monomer;
an electrochemically active material and/or an electrically conductive agent; and
an aqueous medium,
wherein the pH-dependent rheology modifier comprises an acid-swellable rheology modifier.

5. The electrodepositable coating composition of claim 1, wherein the binder further comprises a non-fluorinated organic film-forming polymer different than the pH-dependent rheology modifier.

6. The electrodepositable coating composition of claim 5, wherein the non-fluorinated organic film-forming polymer comprises polysaccharides, polyacrylates, polyethylene, polystyrene, polyvinyl alcohol, poly (methyl acrylate), poly (vinyl acetate), polyacrylonitrile, polyimide, polyurethane, polyvinyl butyral, polyvinyl pyrrolidone, styrene butadiene rubber, xanthan gum, or combinations thereof.

7. The electrodepositable coating composition of claim 1, wherein the electrochemically active material comprises $LiCoO_2$, $LiNiO_2$, $LiFePO_4$, $LiFeCoPO_4$, $LiCoPO_4$, $LiMnO_2$, $LiMn_2O_4$, $Li(NiMnCo)O_2$, $Li(NiCoAl)O_2$, carbon-coated $LiFePO_4$, sulfur, $LiO_2$, $FeF_2$ and $FeF_3$, Si, aluminum, tin, SnCo, $Fe_3O_4$, or combinations thereof.

8. The electrodepositable coating composition of claim 1, wherein the electrochemically active material comprises graphite, lithium titanate, lithium vanadium phosphate, silicon, silicon compounds, tin, tin compounds, sulfur, sulfur compounds, lithium metal, graphene, or a combination thereof.

9. The electrodepositable coating composition of claim 1, wherein the electrically conductive agent comprises conductive carbon black, carbon nanotubes, graphene, graphite, carbon fibers, fullerenes, and combinations thereof.

10. The electrodepositable coating composition of claim 1, wherein the crosslinking agent comprises carbodiimide.

11. The electrodepositable coating composition of claim 1, wherein the electrodepositable coating composition comprises:
(a) 0.1% to 10% by weight of the pH-dependent rheology modifier;
(b) 0.02% to 2% by weight of the crosslinking agent;
(c) 45% to 99% by weight of the electrochemically active material;
(d) optionally 0.5% to 20% by weight of an electrically conductive agent; and
(e) optionally 0.1% to 9.9% by weight of a non-fluorinated organic film-forming polymer; the % by weight based on the total solids weight of the electrodepositable composition.

12. The electrodepositable coating composition of claim 1, wherein the electrodepositable coating composition has a volatile organic content of no more than 500 g/L.

13. The electrodepositable coating composition of claim 1, wherein a coating produced on a substrate by electrocoating the electrodepositable coating composition of claim 1 has a 90° peel strength of at least 100 N/m at a mass loading of 2.15 mg/cm$^2$, the 90° peel strength measured according to PEEL STRENGTH TEST METHOD.

14. The electrodepositable coating composition of claim 1, wherein the electrodepositable coating composition is substantially free of fluoropolymer.

15. The electrodepositable coating composition of claim 1, wherein the electrodepositable coating composition is substantially free of cellulose-based materials.

16. The electrodepositable coating composition of claim 1, wherein the pH-dependent rheology modifier is substantially free of amide, glycidyl and hydroxyl groups.

17. The electrodepositable coating composition of claim 1, wherein the pH-dependent rheology modifier is substantially free of the residue of constitutional units comprising aromatic vinyl monomers.

18. A method of coating a substrate comprising:
electrocoating the electrodepositable coating composition of claim 1 onto at least a portion of the substrate.

* * * * *